United States Patent Office 3,763,225
Patented Oct. 2, 1973

3,763,225
PERFLUOROALIPHATIC SUBSTITUTED AMINES
Louis Foulletier, Oullins, and Jean-Pierre Lalu, La Mulatiere, France, assignors to Produits Chimiques Ugine Kuhlmann
No Drawing. Continuation of application Ser. No. 819,479, Apr. 25, 1969, which is a continuation-in-part of application Ser. No. 694,090, Dec. 28, 1967, both now abandoned. This application Apr. 29, 1971, Ser. No. 138,820
Claims priority, application France, Jan. 2, 1967, 89,676; Sept. 15, 1967, 121,188; Nov. 7, 1967, 127,254; Apr. 29, 1968, 149,848; Aug. 20, 1970, 7030550
Int. Cl. C07c 69/54
U.S. Cl. 260—486 H  21 Claims

ABSTRACT OF THE DISCLOSURE

This invention comprises perfluoroaliphatic substituted amino compounds of the formula $$C_nF_{2n+1}(CR^1R^2)_mN(R^3)-(CHR)_q-OCOCR^4=CH_2 \quad (I)$$

wherein $n$ is an integer from 1 to about 20, $m$ is 2 or 4, $q$ is an integer from 1 to 10, $R^1$ and $R^2$ each is a hydrogen atom or a lower alkyl containing 1 to 3 carbon atoms, and $R^3$ an alkyl radical containing 1 to 20 carbon atoms, an alkenyl containing 3 to 10 carbon atoms, a cycloparaffin radical containing 3 to 12 carbon atoms, a cycloalkenyl radical containing 5 to 12 carbon atoms, an N or O ring substituted cycloalkenyl radical containing 5 to 12 carbon atoms, an aryl, the radical $C_nF_{2n+1}-(CR_1R_2)_m-$ or the radical $-COCR^4=CH_2$, R is a hydrogen atom or a lower alkyl containing 1 to 3 carbon atoms, and $q$ is an integer from 1 to 10 and $R^4$ is a hydrogen atom or a methyl group and the method for preparing the same. This invention also comprises perfluoroaliphatic amino compounds of the formula $$C_{n-1}F_{2n-1}-CF=CR^1-CHR^1-N(R^3)-(CHR)_q-OCOCR^4=CH_2 \quad (II)$$

and mixtures of products of Formula II with compounds of the formula $$C_nF_{2n+1}(CHR^1)_2N(R^3)-(CHR)_q-OCOCR^4=CH_2 \quad (III)$$

CROSS REFERENCES TO RELATED APPLICATIONS

This is a continuation of our prior application Ser. No. 819,479, filed Apr. 25, 1969, now abandoned which is a continuation-in-part of our previously filed application Ser. No. 694,090, filed Dec. 28, 1967, now abandoned.

FIELD OF THE INVENTION

This invention relates to perfluoroaliphatic substituted amine compounds and the method for preparing the same.

DESCRIPTION OF THE PRIOR ART

It is well known that nonfluorinated alkyl halides of the formula $C_nH_{2n+1}X$ wherein $n$ is an integer and $X$ is a halogen, react with ammonia and with amines to produce various substituted amine and quaternary ammonium salts. However, in the case of fluorinated alkyl halides of the formula $$C_nF_{2n+1}-CH_2CH_2-Y$$

wherein $n$ has the same meaning as stated above and Y is a halogen, the halides become readily dehydrohalogenated in the presence of nucleophilic agents such as various amines which include the tertiary amine to yield fluorinated olefins of the formula $$C_nF_{2n+1}-CH=CH_2$$

SUMMARY OF THE INVENTION

We have discovered that it is possible according to the method of this invention to prepare a perfluoroalkyl substituted amino compound of the formula $$C_nF_{2n+1}(CR^1R^2)_mN(R^3)-(CHR)_q-OCOCR^4=CH_2 \quad (I)$$

wherein $n$ is an integer from 1 to about 20, $m$ is 2 or 4, $q$ is an integer from 1 to 10, $R^1$ and $R^2$ each is a hydrogen atom or a lower alkyl containing 1 to 3 carbon atoms, $R^3$ is an alkyl radical containing 1 to 20 carbon atoms, an alkenyl containing 3 to 10 carbon atoms, a cycloparaffin radical containing 3 to 12 carbon atoms, a cycloalkenyl radical containing 5 to 12 carbon atoms, an N or O ring substituted cycloalkenyl radical containing 5 to 12 carbon atoms, an aryl, the radical $C_nF_{2n+1}-(CR_1R_2)_m-$ or the radical $-COCR^4=CH_2$, R is a hydrogen atom or a lower alkyl containing 1 to 3 carbon atoms, $q$ is an integer from 1 to 10, and $R^4$ is a hydrogen atom or a methyl group by reacting at a temperature in the range between 0° C. and 200° C. and in the presence of a polymerization inhibitor and with or without one of the group selected from hydracid acceptor, water acceptor, and transesterification catalyst (a) a perfluoroalkyl amino alcohol of the formula $$C_nF_{2n+1}(CR^1R^2)_m-N(R^3)-(CHR)_q-OH \quad (IV)$$

wherein $n$, $m$, $R^1$, $R^2$, $R^3$, R and $q$ have the same meaning as defined above with (b) and acrylic compound of the formula $$XCOCR^4=CH_2 \quad (V)$$

wherein X is a chlorine atom, an OH group, a $$-O-COCR^4=CH_2$$

group or an alkoxy containing 1 to 8 carbon atoms and $R^4$ has the same meaning as defined above. Perfluoroaliphatic amino alcohols of the formula $$C_nF_{2n+1}(CHR^1)_2-N(R^3)-(CHR)_q-OH \quad (VI)$$

together with perfluoroaliphatic aminoalcohols of the formula $$C_{n-1}F_{2n-1}CF=CR^1-CHR^1-N(R^3)-(CHR)_q-OH \quad (VII)$$

wherein $R^1$, $R^3$, R and $q$ have the same meaning previously given and $n$ is an integer from 4 to 20, when reacted with an acrylic compound corresponding to Formula V according to the process of this invention simultaneously yield compounds having the formula $$C_nF_{2n+1}(CHR^1)_2-N(R^3)-(CHR)_q-OCOCR^4=CH_2 \quad (III)$$

together with compounds of the formula $$C_{n-1}F_{2n-1}CF=CR^1-CHR^1-N(R^3)-(CHR)_q-OCOCR^4=CH_2 \quad (II)$$

wherein $R^1$, $R^3$, $R^4$, R and $q$ have as stated above and $n$ is an integer from 4 to 20.

DESCRIPTION OF THE PREFERRED EMBODIMENT

The mixture of perfluoroaliphatic aminoalcohols suitable for this invention are prepared according to our copending U.S. application filed concurrently herewith, entitled "Perfluoroaliphatic Substituted Amino Alcohols and the Method for Preparing the Same," Ser. No. 138,-

808. It is therein disclosed that perfluoroaliphatic substituted aminoalcohols of the formula $$C_nF_{2n+1}(CR^1R^2)_m\underset{\underset{R^3}{|}}{N}-(CHR)_qOH \quad (IV)$$

wherein N, $m$, $R^1$, $R^2$, $R^3$, R and $q$ have the same meaning as stated above are prepared by reacting at a temperature in the range between 0° and 200° C., perfluoroalkyl halides of the formula $$C_nF_{2n+1}(CR^1R^2)_mY \quad (VIII)$$

with an aminoalcohol of the formula $$HR^3N(CHR)_qOH \quad (IX)$$

wherein $R^3$, R and $q$ have the same meaning as previously stated. It is also disclosed therein that perfluoroaliphatic substituted aminoalcohols of the formula $$C_nF_{2n+1}(CHR^1)_r-\underset{\underset{R^3}{|}}{N}-(CHR)_qOH \quad (X)$$

and mixtures of XV with compounds of the formula $$C_{n-1}F_{2n-1}-CF=CR^1-CHR^1-\underset{\underset{R^3}{|}}{N}-(CHR)_qOH \quad (XI)$$

are prepared in the same manner as Formula IV compounds except that in the starting compounds of Formula IV, at least one of the radicals $R^1$ or $R^2$ is hydrogen, $m$ is equal to 2 and $n$ is an integer between 4 and 20. The preferred perfluoroaliphatic aminoalcohols of this invention are compounds X together with XI.

The suitable acrylic compounds have the formula $$XCOCR^4=CH_2 \quad (V)$$

When X is a chlorine atom, the reaction depicted above is carried out in the presence of a hydracid acceptor such as tertiary amines containing from 3 to 20 carbon atoms, for example, trimethylamine, triethylamine, tripropylamine, tributylamine, tripentylamine, pyridine. When X is the OH water acceptor such as sulfuric acid, or a molecular sieve; the water may also be eliminated by azeotropic distillation using a solvent which is inert with respect to the reactants. When X is an alkoxy group, the operation is carried out with or without a transesterification catalyst such as acid or basic catalysts, for example, sulfuric acid, p-toluenesulfonic acid, an acid resin, an aluminum alcoholate. The alcohol formed in the reaction medium may be retained or may be eliminated by distillation at the time of the reaction. Regardless of the acrylic compound the reaction is carried out in the presence of a polymerization inhibitor such as hydroquinone, phenolthiazine, and t-butylphenol.

The new compounds according to the invention have very interesting and varied applications. Thus, the monomers obtained can be polymerized or copolymerized with other acrylic, methacrylic, or vinylic molecules by the usual methods.

These strongly fluorinated polymers and copolymers, used in solution or in dispersion, are extremely powerful olephobic and hydrophobic agents. Their chemical stability and especially their resistance to hydrolysis make it possible for them to assure a durable protection to the textiles and other substrata, such as paper, leather, etc., on which they are used. They can also be added to other polymers such as, in particular, natural or synthetic elastomers, butadiene-styrene and butadiene-acrylonitrile copolymers, chloroprene polymers, acrylic elastomers, etc., to improve their surface properties.

The following examples illustrate the new products according to the invention. The following examples, 1 to 7, also employ a mixture of saturated and unsaturated perfluoroaliphatic aminoalcohols as reported in Examples 8 to 11. However, the corresponding unsaturated amino compound was added to the reaction mixture admixed with the saturated amino compound and the individual quantities of the saturated and unsaturated compound were reported as the total amount of perfluoroalkyl aminoalcohol reacted. Example 12 did not yield a mixture of compounds.

Example 1

Acrylic chloride (3 grams, 0.03 mole) was added drop by drop and under continuous agitation to $$C_6F_{13}C_2H_4N(CH_3)C_2H_4OH$$

at room temperature. The reaction was exothermic and there immediately appeared a white solid. After reaction, the white solid was dried by light heating under a very high vacuum. There were obtained 12 grams of the chlorhydrate of $$C_6F_{13}C_2H_4N(CH_3)C_2H_4OCOCH=CH_2$$

with a yield of 92%.

Example 2

Acrylic chloride (11.7 grams; 0.13 mole) was added drop by drop, under continuous agitation, to a solution of $$C_6F_{13}C_2H_4N(CH_3)C_2H_4OH$$

(50.5 grams; 0.12 mole), triethylamine (12 grams; 0.12 mole), and hydroquinone (0.1 gram) in methylene chloride (120 grams) maintaining a temperature less than 5° C. with an ice bath. After reaction, the precipitated triethylamine chlorhydrate was filtered and ethyl ether was added to the filtrate to precipitate the triethylamine, chlorhydrate remaining in solution in the methylene chloride. After filtration, the solvents were eliminated by evaporation under vacuum. Hydroquinone (0.1 gram) was added to the residual liquid and it was distilled. There were thus obtained two fractions:

(a) 90–100° C./0.05 mm. Hg fraction, 48 grams: this fraction was made up of $$C_6F_{13}C_2H_4N(CH_3)C_2H_4OCOCH=CH_2$$

(b) Solid residue: 2 grams of a polymerized solid.
The yield of the experiment reached 85%.

Example 3

Acrylic chloride (13.5 grams; 0.15 mole) was added drop by drop under continuous agitation to a solution of $$C_4F_9-C_2H_4-N(C_6H_5)-C_2H_4OH$$

(53.6 grams; 0.14 mole), triethylamine (15 grams; 0.15 mole) and hydroquinone (0.2 gram) in methylene chloride (140 grams) maintaining a temperature less than 5° with an ice bath. After reaction, the precipitated triethylamine chlorhydrate was filtered and ethyl ether was added to the filtrate to precipitate the triethylamine chlorhydrate remaining in solution in the methylene chloride. After filtration, the solvents were eliminated by evaporation under vacuum, hydroquinone (0.2 gram) was added, and the residual liquid was distilled. There were thus obtained two fractions:

(a) 150–160°/0.1 mm. Hg fraction; 50.1 grams.
(b) Solid residue, 2.5 grams.
The fraction is made up of $$C_4F_9C_2H_4N(C_6H_5)C_2H_4OCOCH=CH_2$$

This acrylate was obtained with a yield of 82%.

Example 4

Acrylic chloride (13.5 grams; 0.15 mole) was added drop by drop under continuous agitation to a solution of $$C_4F_9-C_2H_4-N(c-C_6H_{11})-C_2H_4OH$$

(54.5 grams; 0.14 mole), triethylamine (15 grams; 0.15 mole), and hydroquinone (0.2 gram) in methylene chloride (140 grams), maintaining a temperature less than 5° with an ice bath. After reaction, the precipitated triethylamine chlorhydrate was filtered and ethyl ether was added to the filtrate to precipitate the triethylamine chlorohydrate remaining in solution in the methylene chloride. After filtration, the solvents were eliminated by evaporation under vacuum, hydroquinone (0.2 gram) was added to the solution, and the residual liquid was distilled.

There were thus obtained two fractions:
(a) 125–135°/0.1 mm. Hg fraction, 55.7 grams.
(b) Solid residue, 2.8 grams.

The fraction is made up of

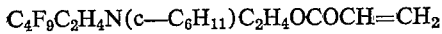

This acrylate was obtained with a yield of 90%.

Example 5

In a flask, acrylic chloride (4.8 grams; 0.05 mole) was added drop by drop under constant stirring to a solution of

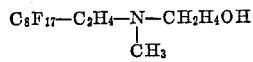

(26.05 grams; 0.05 mole), triethylamine (5.05 grams; 0.05 mole), and hydroquinone (0.1 gram) in methylene chloride (50 grams), while maintaining a temperature below 5° by means of an ice-water bath. After completion of the reaction, the triethylamine hydrochloride which precipitated was filtered off, and ethyl ether was added to the filtrate in order to precipitate the triethylamine hydrochloride which remained in solution in the methylene chloride. After a second filtration, the solvents were eliminated by evaporation under vacuum. Hydroquinone (0.1 gram) was then added to the residual liquid, which was distilled in a molecular distillation apparatus. Thus,

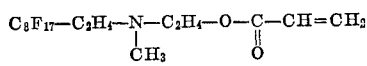

(24.1 grams; 0.042 mole) boiling at 110°–120°/0.1 mm. was obtained.

Conversion rate was 84%.

Example 6

In a flask, acrylic chloride (4.8 grams; 0.05 mole) was added drop by drop under constant stirring to a solution of

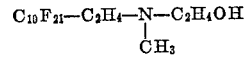

(31.05 grams; 0.05 mole), triethylamine (5.05 grams; 0.05 mole), and hydroquinone (0.1 gram) in methylene chloride (60 grams), while maintaining a temperature below 5° by means of an ice-water bath. After completion of the reaction, the triethylamine hydrochloride precipitated was filtered off, and ethyl ether was added to the filtrate in order to precipitate the triethylamine hydrochloride which remained in solution in the methylene chloride. After a second filtration, the solvents were eliminated by evaporation under vacuum. Finally, hydroquinone (0.1 gram) was added to the very viscous residual liquid which was distilled in a molecular distillation apparatus. Thus

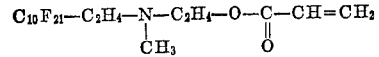

(26.6 grams; 0.0395 mole) boiling at 150–170° under 0.1 mm. Hg and melting at about 30° was obtained.

Example 7

Acrylic chloride (5 grams; 0.055 mole) was added drop by drop and under continuous agitation to a solution of $$C_6F_{13}-C_2H_4-NH-CH_2CH_2OH$$

(21 grams; 0.052 mole) and triethylamine (5 grams; 0.05 mole) in methylene chloride (60 cm.³), cooling the reaction vessel with an ice-water bath. After reaction, the precipitated triethylamine chlorhydrate was filtered and ethyl ether was added to the filtrate to precipitate the triethylamine chlorhydrate remaining in solution in the methylene chloride. After filtration, the solvents were eliminated by prolonged evaporation under vacuum. The viscous residual liquid (20 grams), which was difficult to purify, was made up of

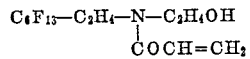

containing $$C_6F_{13}C_2H_4NHC_2H_4OCOCH=CH_2$$

as an impurity.

Example 8

Acrylic chloride (11.7 grams) was added drop by drop with constant agitation to a solution (49 grams) containing [0.04] mole

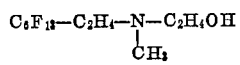

and 0.078 mole

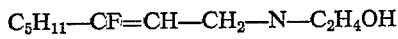

triethylamine (12 grams) and hydroquinone (0.19 gram) in methylene chloride (120 grams) while maintaining a temperature below 5° C. by means of an ice bath. After the reaction, the triethylamine precipitate was filtered and ethyl ether was added to the filtrate in order to precipitate any triethylamine chlorhydrate remaining in the methylene chloride. After filtration, the solvents were removed by vacuum evaporation. Hydroquinone (0.1 gram) was added to the residual liquid which was distilled yielding two fractions.

(a) 90–100° C./0.05 mm. Hg fraction: 46 grams, containing 34%

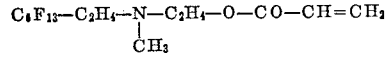

(Yield=28.8%) and 66%

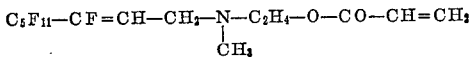

(Yield 56.2%).

(b) Solid residue 2 grams of an unidentified polymerized solid.

Example 9

Acrylic chloride (4.8 grams) was added drop by drop with constant agitation to a flask containing a solution (25 grams) of 0.0325 mole

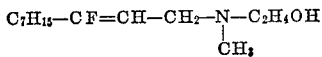

and 0.0175 mole

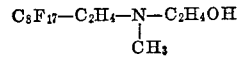

triethylamine (5.05 grams) and hydroquinone (0.1 gram) in methylene chloride (50 grams) while maintaining a temperature beneath 5° C. by means of an ice bath. After reaction, the triethylamine chlorhydrate precipitate was filtered and ethyl ether was added to the filtrate in order to precipitate any triethylamine chlorhydrate remaining in the methylene chloride. After a second filtration the solvents were eliminated under vacuum. Then hydroquinone (0.1 gram) was added to the residual liquid which was distilled using molecular distillation apparatus. 23.3 grams of a mixture coming off at 110–120° C./0.1 mm. Hg and containing 0.0286 mole of

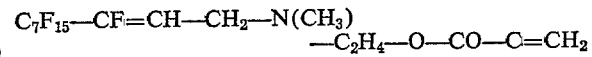

and 0.134 mole of

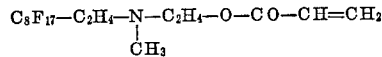

was obtained. Total yield 64%.

Example 10

Acrylic chloride (4.8 grams) was added drop by drop under constant agitation to a flask containing a solution (30.5 grams) of 0.021 mole $$C_{10}F_{21}-C_2H_4-N(CH_3)-C_2H_4OH$$

and 0.029 mole $$C_9F_{19}-CF=CH-CH_2-N(CH_3)-C_2H_4OH,$$

triethylamine (5.05 grams) and hydroquinone (0.1 gram) in methylene chloride (60 grams) while maintaining a temperature lower than 5° by means of an ice bath. After the reaction, the triethylamine chlorhydrate precipitate was filtered and ethyl ether was added to the filtrate in order to precipitate any triethylamine chlorhydrate remaining in the methylene chloride. After a second filtration, the solvents were removed under vacuum. Hydroquinone (0.1 gram) was added to the very viscous residual liquid which was distilled in a molecular distillation apparatus 26 grams of a mixture containig 9.9166 mole.

$$C_{10}F_{21}-C_2H_4-\underset{\underset{CH_3}{|}}{N}-C_2H_4-O-\underset{\underset{O}{\|}}{C}-CH=CH_2$$

0.022 mole $$C_9F_{19}-CF=CH-CH_2-N(CH_3)-C_2H_4-O-\underset{\underset{O}{\|}}{C}-CH=CH_2$$

coming off at 150–170° C./0.1 mm. Hg melting at about 30° C. was obtained. Total yield was 79%.

Example 11

Acrylic chloride (13.5 grams) was added drop by drop with constant stirring to a solution (54.4 grams) containing 0.131 mole $$C_4F_9-C_2H_4-N(C_6H_{11})-C_2H_4OH$$

and 0.009 mole $$C_3F_7-CF=CH-CH_2-N(C_6H_{11})C_2H_4OH,$$

triethylamine (15 grams) and hydroquinone (0.2 gram) in methylene chloride (140 grams) while maintaining a temperature beneath 5° C. by means of an ice bath. After the reaction, the triethylamine chlorhydrate precipitate was filtered and ethyl ether was added to the filtrate to precipitate any triethylamine chlorhydrate remaining in the methylene chloride. After filtration, the solvents were evaporated under vacuum and 0.2 gram hydroquinone was added to the residual liquid which was then distilled. A fraction and a residue were obtained:

(a) 125–135° C./0.1 mm. Hg fraction: weighed 55.7 grams.

(b) Solid residue 2.8 grams, contained 93%

$$C_4F_9-C_2H_4-N(C_6H_{11})C_2H_4-O-CO-CH=CH_2$$

(yield was 24.0%) and $$C_3F_7-CF=CH-CH_2-N(C_6H_{11})-C_2H_4-OCO-CH=CH_2$$

(Yield was 6.4%).

Example 12

In a flask, acrylic chloride (2.86 grams; 0.03 mole) was added drop by drop under constant stirring to a solution of $$C_6F_{13}(C_2H_4)_2\underset{\underset{CH_3}{|}}{N}-C_2H_4OH$$

(13.5 grams; 0.03 mole), triethylamine (3.03 grams; 0.03 mole), and hydroquinone (0.1 gram) in methylene chloride (30 grams), while maintaining a temperature below 5° by means of an ice-water bath. After completion of the reaction, the triethylamine hydrochloride formed was filtered off, and ethyl ether was added to the filtrate in order to precipitate the triethylamine hydrochloride which remained in solution in the methylene chloride. After a second filtration, the solvents were eliminated by evaporation under vacuum. Finally hydroquinone (0.1 gram) was added to the residual liquid, which was distilled in a molecular distillation apparatus. Thus, $$C_6F_{13}(C_2H_4)_2N-C_2H_4-O-\underset{\underset{O}{\|}}{C}-CH=CH_2$$
$$\underset{CH_3}{|}$$

(13.2 grams; 0.026 mole) boiling 125°–135° under 0.1 mm. Hg was obtained.

Conversion rate was 87%.

We claim:

1. A perfluoro substituted compound of the formula $$C_nF_{2n+1}(CR^1R^2)_mN-(CHR)_q-OCOC=CH_2$$
$$\underset{R^3}{|}\qquad\qquad\underset{R^4}{|}$$

wherein $n$ is an integer from 1 to about 20, $m$ is 2 or 4, $q$ is an integer from 1 to 10, $R^1$, $R^2$, and $R$ each is a hydrogen atom or a lower alkyl containing 1 to 3 carbon atoms, and $R^3$ is an alkyl containing 1 to 20 carbon atoms, an alkenyl containing 3 to 10 carbon atoms, a cyclo paraffin radical containing 3 to 12 carbon atoms, a cycloalkenyl radical containing 5 to 12 carbon atoms, an aryl, the radical $$C_nF_{2n+1}-(CR^1R^2)_m$$

and $R^4$ is a hydrogen atom or a methyl group.

2. An amine according to claim 1 wherein $n$ is from 6–12, and $m$ is 2, and $R^1$ and $R^2$ each is a hydrogen atom.

3. A compound according to claim 2 wherein the compound has the formula $$C_6F_{13}C_2H_4-N(CH_3)-C_2H_4-OCOCH=CH_2$$

4. A compound according to claim 1 wherein the compound has the formula $$C_4F_9C_2H_4-N(C_6H_5)C_2H_4OCOCH=CH_2$$

5. A compound according to claim 1 wherein the compound has the formula $$C_4F_9C_2H_4-N(C_6H_{11})C_2H_4OCCH=CH_2$$

6. A compound according to claim 1 wherein $n$ is from 6 to 12, and $m$ is 4, and $R^1$ and $R^2$ each is a hydrogen atom.

7. A compound according to claim 2 wherein the compound has the formula $$C_8F_{17}-C_2H_4-N(CH_3)-C_2H_4-O-CO-CH=CH_2$$

8. A compound according to claim 2 wherein the compound has the formula $$C_{10}F_{21}-C_2H_4-N(CH_3)-C_2H_4-O-CO-CH=CH_2$$

9. A compound according to claim 6 wherein the compound has the formula $$C_6F_{13}(C_2H_4)_2N(CH_3)-C_2H_4-O-CO-CH=CH_2$$

10. A compound according to claim 6 wherein the compound has the formula $$C_8F_{17}(C_2H_4)_2N(CH_3)-C_2H_4-O-CO-CH=CH_2$$

11. A compound according to claim 6 wherein the compound has the formula $$C_{10}F_{21}(C_2H_4)_2N(CH_3)-C_2H_4-O-CO-CH=CH_2$$

12. A perfluoroaliphatic substituted amino compound of the formula $$C_{n-1}F_{2n-1}-CF=CR^1-CHR^1-N-(CHR)_q-OCOCR^4=CH_2$$
$$\underset{R^3}{|}$$

wherein $R$, $R^1$, $R^3$, $R^4$ and $q$ have the same meaning as defined in claim 1 and $n$ is an integer from 4 to 20.

13. An amine according to claim 12 wherein $n$ is from 6 to 12, and $R^1$ is a hydrogen atom.

14. A compound according to claim 13 wherein the compound has the formula $$C_5F_{11}CF=CH-CH_2-N(CH_3)-C_2H_4-OCOCH=CH_2$$

15. A compound according to claim 12 wherein the compound has the formula $$C_3H_7CF=CH-CH_2-N(C_6H_{11})C_2H_4OCOCH=CH_2$$

16. A compound according to claim 12 wherein the compound has the formula $$C_3H_7CF=CH-CH_2-N(CH_6H_{11})C_2H_4OCOCH=CH_2$$

17. A composition of matter consisting essentially of a perfluoroalkyl substituted amino compound of the formula $$C_nF_{2n+1}(CHR^1)_2N-(CHR)_q-OCOC=CH_2$$
$$\quad\quad\quad\quad\quad\quad\quad |\quad\quad\quad\quad |$$
$$\quad\quad\quad\quad\quad\quad R^3\quad\quad\quad R^4$$

together with a perfluoroaliphatic substituted amino compound of the formula $$C_{n-1}F_{2n-1}-CF=CR^1-CHR^1-N-(CHR)_q-OCOCR^1=CH_2$$
$$\quad\quad\quad\quad\quad\quad\quad\quad\quad\quad\quad\quad |$$
$$\quad\quad\quad\quad\quad\quad\quad\quad\quad\quad\quad R^3$$

wherein R, R¹, R³, R⁴ and q have the same meaning as defined in claim 16 and n is an integer from 4 to 20.

18. A composition of matter according to claim 11 wherein n is from 6 to 12, and R¹ is a hydrogen atom.

19. A composition of matter according to claim 12 having the formula $$C_6F_{13}C_2H_4-N(CH_3)-C_2H_4-OCOCH=CH_2$$

together with the compound having the formula $$C_5F_{11}CF=CH-CH_2-N(CH_3)-$$
$$\quad\quad\quad\quad\quad\quad\quad\quad\quad C_2H_4-OCOCH=CH_2$$

20. A composition of matter according to claim 12 having the formula $$C_4F_9C_2H_4-N(C_6H_5)C_2H_4OCOCH=CH_2$$

together with the compounds having the formula $$C_3C_7CF=CH-CH_2-N(C_6H_5)C_2H_4OCOCH=CH_2$$

21. A composition of matter according to claim 12 having the formula $$C_4F_9C_2H_4-N(C_6H_{11})C_2H_4OCOCH=CH_2$$

together with the compound having the formula $$C_3F_7CH=CH-CH_2-N(C_6H_{11})C_2H_4OCOCH=CH_2$$

No references cited.

LORRAINE A. WEINBERGER, Primary Examiner

P. J. KILLOS, Assistant Examiner

U.S. Cl. X.R.

117—60, 139.5 A, 142; 260—89.5 N, 563 R, 570.6, 584 R

UNITED STATES PATENT OFFICE
CERTIFICATE OF CORRECTION

Patent No. 3,763,225  Dated October 2, 1973

Inventor(s) Louis Foulletier et al.

It is certified that error appears in the above-identified patent and that said Letters Patent are hereby corrected as shown below:

Column 7, Line 20

Reads 9.9166    Should read 0.0166

In the Claims reads:    Should read (from Amendment):

Column 8, Line 12

Reads perfluoro    Should read perfluoroalkyl

Column 9, Line 7

Reads $N(CH_6H_{11})$    Should read $N(C_6H_{11})$

Column 10, Line 10

Reads $C_3C_7CF$    Should read $C_3F_7CF$

Column 10, Line 17

Reads $C_3F_7CH$    Should read $C_3F_7CF$

Signed and sealed this 7th day of May 1974.

(SEAL)
Attest:

EDWARD M. FLETCHER, JR.
Attesting Officer

C. MARSHALL DANN
Commissioner of Patents